Patented Nov. 21, 1950

2,530,430

UNITED STATES PATENT OFFICE 2,530,430

PROCESS FOR THE MANUFACTURE OF 4-AMINOBENZAL-THIOSEMICARBAZONE

Rudolf Hirt, Muri, near Berne, Switzerland, assignor to Dr. A. Wander A.-G., Berne, Switzerland No Drawing. Application January 10, 1950, Serial No. 137,899. In Switzerland February 24, 1949

1 Claim. (Cl. 260—552)

It was found that 4-aminobenzal-thiosemicarbazone and a number of its substitution products have an inhibitory action on the growth of tubercle bacilli. Among the derivatives those are of particular interest in which the substitution is made in the aromatic amino group. Several of the monoalkyl- as well as of the dialkyl- and acyl-substituted 4-aminobenzal - thiosemicarbazones have a powerful action, whereby the acyl derivatives are on the whole characterised by a lower degree of toxicity.

Pure 4-aminobenzaldehyde, which has been employed hitherto for the production of the above-mentioned products, is readily decomposed and polymerises within a very short time. Hence, it is exceedingly difficult to obtain this substance in pure form.

It has now been discovered that it is not necessary to use pure 4-aminobenzaldehyde as starting material for the production of 4-aminobenzal-thiosemicarbazone. The product obtained by boiling 4-nitrotoluene with a solution of sulfure in aqueous alcoholic sodium hydroxide solution (German Patent No. 86,874 and Blanksma R. 28,109) and which probably consists of 4-aminobenzal-toluidine, can be treated directly with thiosemicarbazide in aqueous alcoholic solution. Hereby the toluidine is replaced by the thiosemicarbazone rest and, following suitable isolation, 4-aminobenzal-thiosemicarbazone is obtained in good quantities. It melts at 198° under decomposition.

From this substance it is possible to produce a large variety of derivatives. For instance, an almost quantitative yield of 4-acetyl-aminobenzal-thiosemicarbazone (M. P.: 220°, decomp.) is obtained by treatment with acetic anhydride in acetone solution. By treatment of the hydrochloride of 4-amino-benzal-thiosemicarbazone in aqueous solution with potassium cyanate, 4-ureidobenzal-thiosemicarbazone is produced, having a M. P. of 232°, decomp. By treatment with methyl sulfochloride in acetone solution in the presence of pyridine, 4-methyl-sulfamidobenzal-thiosemicarbazone is obtained which melts at 223° under decomposition.

Example

A mixture of 1600 c. c. of water, 120 gm. of sulfur and 200 gm. of caustic soda is boiled in a reflux condenser until the sulfur is dissolved. The mixture is allowed to cool to 70° and is then treated with a solution of 200 gm. of p-nitrotoluene in 800 c. c. of alcohol. The whole is then boiled for 1 hour in a reflux condenser, whereupon it is distilled with steam until the alcohol is completely removed. The residue is allowed to cool, the oil that has separated out is shaken in 2 litres of ether. The ethereal solution is then filtered if necessary washed with water, dried and freed from ether by distillation.

The residue consists of approx. 150 gm. of a thick, red oil. This latter is dissolved in 200 c. c. of alcohol, treated with 90 gm. of thiosemicarbazide and 100 c. c. of water and heated to boiling point in 1 hour in a reflux condenser. It is then cooled to 40° and stirred into 1.5 litres of diluted 5% sodium hydroxide solution which has been warmed to 40°. Following treatment with animal charcoal and after stirring for a while, the mixture is filtered. The 4-aminobenzal-thiosemicarbazone thus formed is separated from the yellow filtrate as a yellow precipitation by acidification with acetic acid. It is filtered and washed several times first with water and afterwards with alcohol. 4-aminobenzal-thiosemicarbazone thus obtained is a yellow, crystalline powder which melts at 198° under decomposition. It is readily soluble in diluted hydrochloric acid and sodium hydroxide solution. It is to be employed as an intermediate product for the production of pharmaceutical preparations.

What I claim and wish to secure by Letters Patent is:

A process for the production of 4-aminobenzal-thiosemicarbazone, in which 4-nitrotoluene is boiled with a solution of sulfur in aqueous alcoholic sodium hydroxide solution and the product thus obtained is treated directly with thiosemicarbazide in aqueous alcoholic solution.

RUDOLF HIRT.

No references cited.